US009154945B2

(12) United States Patent
Kasslin et al.

(10) Patent No.: US 9,154,945 B2
(45) Date of Patent: Oct. 6, 2015

(54) METHODS AND APPARATUS FOR PRIVACY PROTECTION IN AD HOC NETWORKS

(75) Inventors: Mika Kasslin, Espoo (FI); Philip Ginzboorg, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/611,621

(22) Filed: Sep. 12, 2012

(65) Prior Publication Data
US 2014/0073290 A1 Mar. 13, 2014

(51) Int. Cl.
*H04M 1/66* (2006.01)
*H04W 12/02* (2009.01)
*H04W 12/10* (2009.01)
*H04W 12/04* (2009.01)

(52) U.S. Cl.
CPC .............. *H04W 12/02* (2013.01); *H04W 12/10* (2013.01); *H04W 12/04* (2013.01)

(58) Field of Classification Search
CPC ..... H04W 12/00; H04W 12/06; H04W 12/10; H04W 12/08; H04W 12/12; H04W 48/02
See application file for complete search history.

(56) References Cited

U.S. PATENT DOCUMENTS

| 5,826,186 | A | 10/1998 | Mitchell et al. ................ 455/410 |
| 7,747,218 | B2 * | 6/2010 | Sasai et al. .................... 455/41.2 |
| 8,805,378 | B2 * | 8/2014 | Choi et al. ..................... 455/437 |
| 2006/0165078 | A1 * | 7/2006 | Gopinath et al. ............. 370/389 |
| 2007/0025265 | A1 | 2/2007 | Porras et al. .................. 370/252 |
| 2008/0062958 | A1 * | 3/2008 | Jonsson et al. ................ 370/350 |
| 2009/0034742 | A1 * | 2/2009 | Appenzeller et al. ......... 380/279 |
| 2011/0078453 | A1 * | 3/2011 | Mueck et al. ................. 713/179 |
| 2012/0252447 | A1 * | 10/2012 | Sartori et al. ................. 455/434 |
| 2013/0204829 | A1 * | 8/2013 | Wang et al. ..................... 706/47 |
| 2013/0331031 | A1 * | 12/2013 | Palin et al. ................... 455/41.2 |

FOREIGN PATENT DOCUMENTS

WO WO-2011032605 A1 3/2011

OTHER PUBLICATIONS

Shalabh Jain, et al.; "Wormhole Detection Using Channel Characteristics,": First IEEE International Workshop on Security and Forensics in Communication Systems, Jun. 10, 2012; pp. 6699-6704 abstract, chapters III-V.

(Continued)

*Primary Examiner* — Vladimir Magloire
*Assistant Examiner* — Shantell L Heiber
(74) *Attorney, Agent, or Firm* — Harrington & Smith

(57) ABSTRACT

Systems and techniques for wireless communication. A user device belonging to a group of user devices that may operate as wireless nodes configures a locale parameter based on its sensing of a radio channel. The locale parameter is included in a message readable by members of the group. A group member receiving a message determines a locale parameter based on its own sensing of a radio channel and responds to a received message only if the locale parameter in the message matches the locale parameter based on the sensing of the radio channel by the receiving member within specified bounds.

27 Claims, 3 Drawing Sheets

(56) References Cited

OTHER PUBLICATIONS

Hu, L., et al.; "Using Directional Antennas to Prevent Wormhole Attacks" Network and Distributed System Symposium (NDSS 2004) San Diego, California, USA. Feb. 2004, pp. 1-11, chapters 5.1-5.3.

P. Papadimitratos, M. Poturalski, P. Schaller, P. Lafourcade, D. Basin, S. Capkun, and J.-P. Hubaux. Secure Neighborhood Discovery: A Fundamental Element for Mobile Ad Hoc Networking. IEEE Communications Magazine, 46(2), Feb. 1, 2008, pp. 132-139. RF Fingerprinting (p. 138).

* cited by examiner

METHODS AND APPARATUS FOR PRIVACY PROTECTION IN AD HOC NETWORKS

FIELD OF THE INVENTION

The present invention relates generally to wireless communication. More particularly, the invention relates to improved systems and techniques for preserving privacy for members of ad hoc communication networks.

BACKGROUND

One simple and convenient way to achieve private communications is for groups of wireless devices to be organized into flexible networks that can accommodate changing members. Nodes of an ad hoc network may be mobile telephones, especially devices such as smartphones capable of both voice and data communication. Members of a group may wish to maintain their communications private, and may seek both to protect the content of their messages and the origin of their messages. Group members may wish to conceal both the fact that a message is coming from a particular node, and may also wish to conceal the fact that nodes belong to the group. Members of a group may encrypt their traffic using a shared key K, and may also anonymize a group identifier by using mechanisms such as a community pseudonym, not associated with any particular node.

It is known, however, that various mechanisms exist by which attackers attempt to identify the presence of group members. One such mechanism is a replay attack, identifying the presence in a local network of members of the private group. If a wireless device responds to a message from the group with an encrypted message of its own, it is highly likely that the responding device belongs to the group. An attacker who does not know the group key and cannot read encrypted messages may nevertheless attempt to identify group members by recording and rebroadcasting a valid query. Various mechanisms have been developed that are generally effective in defending against a query that is replayed in the same network in which it originated. One approach is limiting the number of times a node can respond to a query, such as one time. Another approach, which may be used together with the first, is to limit the validity time of a query. Nodes that have received a query, as will be the case if an attack is attempted in the same network, will fail to respond to the same query more than the specified number of times or outside the validity time of the query.

SUMMARY OF THE INVENTION

In one embodiment of the invention, an apparatus comprises at least one processor and memory storing computer program code. The memory storing the computer program code is configured to, with the at least one processor, cause the apparatus to at least, upon receipt by a receiving wireless node of a message associated with a group of wireless nodes, compare indicia in the message against indicia determined based on sensed radio channel characteristics and direct response to the message by the receiving wireless node only if the indicia in the message match the indicia determined based on the sensed radio channel characteristics within a specified threshold.

In another embodiment of the invention, an apparatus comprises at least one processor and memory storing computer program code. The memory storing the computer program code is configured to, with the at least one processor, cause the apparatus to at least sense characteristics of a radio channel, configure a parameter based on the sensed characteristics, and configure a message for transmission to at least one member of a group of associated wireless nodes configured to privately communicate messages between one another using shared information. The first parameter value is configured so that a receiving wireless node receiving the message will respond to the message only if the first parameter value matches a second parameter value determined by the receiving wireless node based on sensing of a radio channel by the receiving wireless node.

In another embodiment of the invention, a method comprises, upon receipt by a receiving wireless node of a message associated with a group of wireless nodes, comparing indicia in the message against indicia determined based on sensed radio channel characteristics and direct response to the message by receiving wireless node only if the indicia in the message match the indicia determined based on the sensed radio channel characteristics within a specified threshold.

In another embodiment of the invention, a method comprises sensing characteristics of a radio channel, configuring a parameter based on the sensed characteristics, and configuring a message for transmission to at least one member of a group of associated wireless nodes configured to privately communicate messages between one another using shared information. The first parameter value is configured so that a receiving wireless node receiving the message will respond to the message only if the first parameter value matches a second parameter value determined by the receiving wireless node based on sensing of a radio channel by the receiving wireless node.

In another embodiment of the invention, a computer readable medium stores a program of instructions. Execution of the program of instructions by a processor configures an apparatus to at least, upon receipt by a receiving wireless node of a message associated with a group of wireless nodes, compare indicia in the message against indicia determined based on sensed radio channel characteristics and direct response to the message by the receiving wireless node only if the indicia in the message match the indicia determined based on the sensed radio channel characteristics within a specified threshold.

In another embodiment of the invention, a computer readable medium stores a program of instructions. Execution of the program of instructions by a processor configures an apparatus to at least sense characteristics of a radio channel, configure a parameter based on the sensed characteristics, and configure a message for transmission to at least one member of a group of associated wireless nodes configured to privately communicate messages between one another using shared information. The first parameter value is configured so that a receiving wireless node receiving the message will respond to the message only if the first parameter value matches a second parameter value determined by the receiving wireless node based on sensing of a radio channel by the receiving wireless node.

DETAILED DESCRIPTION

Embodiments of the present invention recognize, however, that replaying a query outside of the network in which it originated is more difficult to defend against. If a member of a group is not within the local network in which the query originated, it will not recognize that the query has already been presented, and will therefore interpret the query as new. For example, if messages are exchanged between members of a political or support group organized into an ad hoc network, an attacker may record queries transmitted by members of the group. The attacker may then replay the queries (for example, simultaneously by relaying them for rebroadcast) at a corporate headquarters. Devices that respond to the rebroadcast queries are likely to belong to persons who are members of the group but were not attending the meeting.

Embodiments of the present invention further recognize that knowledge of the location in which a query originated can protect against replay attacks at which queries recorded at one locale are replayed at a different locale. Embodiments of the invention further recognize that battery power is at a premium in mobile devices, especially devices such as smartphones. Embodiments of the present invention therefore provide mechanisms that identify the locale in which a query originated, in a way that avoids excessive power consumption.

Figure 1:
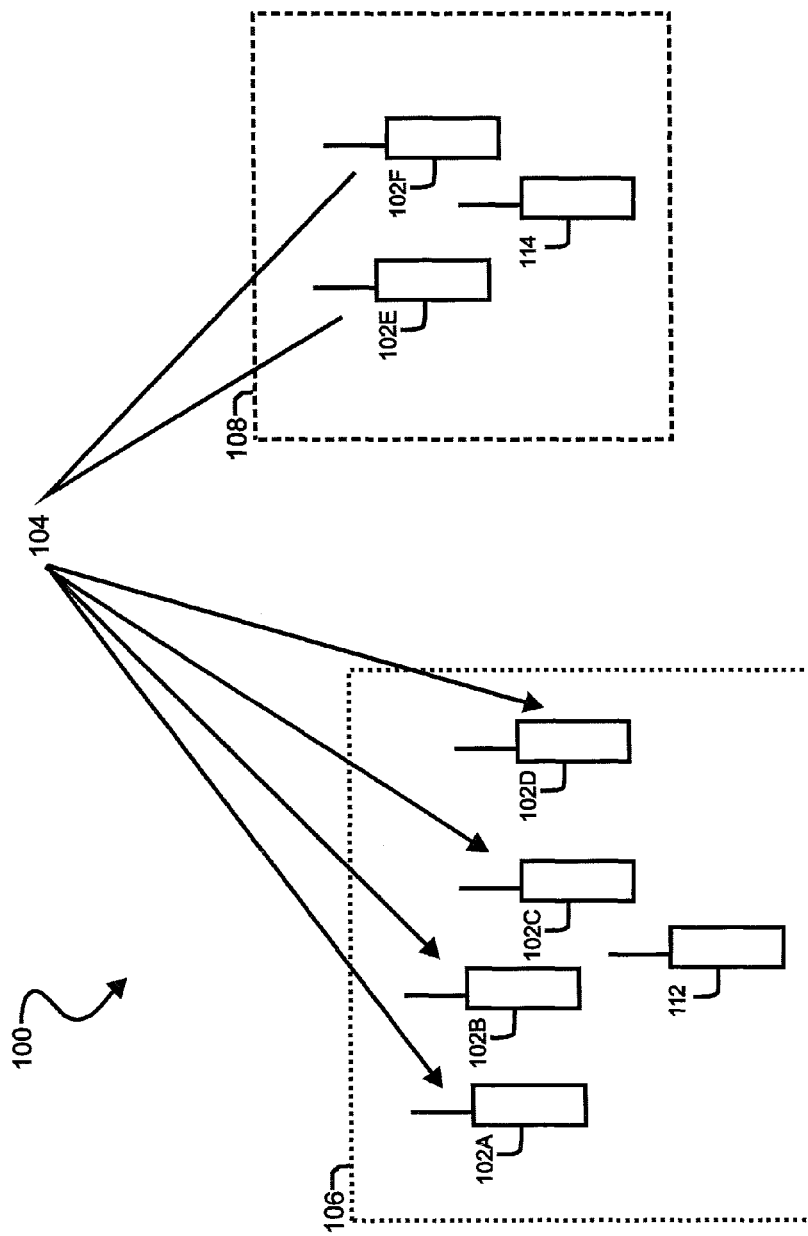
FIG. 1 illustrates a system according to an embodiment of the present invention.

FIG. 1 illustrates a system 100 according to an embodiment of the present invention, comprising a number of wireless nodes 102A-102F. The wireless nodes 102A-102F are members of a group 104, and in one or more embodiments of the invention, the nodes 102A-102F communicate directly with one another through 802.11 standard wireless communication for their communications as part of the group 104. The nodes 102A-102F may suitably be mobile communication devices, and commonly encountered examples of such devices are smartphones and tablet computers, although it will be recognized that any device capable of constructing a message for transmission and presenting a message that has been received, and communicating to transmit and receive messages using the communication mechanisms used by other group members, may participate in the group. The group members 102A-102F may protect the privacy and integrity of their messages by using a shared key K, and may also protect the origin of messages from identification by using an anonymized message header. In one or more exemplary embodiments, the message header may identify a message as coming from one of the members of the group, but not the specific group member.

Under normal circumstances, a node will respond to a query bearing indicia, such as a message header, identifying it as a member of the group. In order to protect against replay attacks, the group members suitably implement restrictions on their responses to queries. For example, as discussed above, a node may respond to a query that has been presented no more than a specified number of times, such as once, and may respond to a query only within a specified time. As noted above, such protections prevent most replay attacks from within the same network from which the replayed query originated, but are ineffective against attacks replayed at a different network.

Therefore, in one or more exemplary embodiments, messages transmitted by member nodes of a group incorporate a locale parameter, included in the message body and encrypted with the group key K. The locale parameter is determined based on the local radio environment, and can be compared by a receiving node against the radio environment that it is experiencing. Such a parameter is difficult for an attacker to duplicate, because it is encrypted and therefore cannot be modified by the attacker, and because it is determined based on actual conditions that will differ between networks. In most cases, radio channel conditions will be difficult to duplicate, especially if there are one, or only a few, attackers.

If radio channel conditions cannot be duplicated, a copied message that is replayed in another network will not have the correct locale parameter for the network in which it is replayed. In addition, the locale parameter itself may be integrity-protected based on the key K shared between the members of the group 104. The locale parameter $\lambda$ may be computed from the fingerprint $\phi$ of the radio channel as $\lambda=F(\phi)$ where F is the one-way cryptographic function.

Therefore, according to one or more embodiments of the invention, the nodes 102A-102D are communicating in location 106. At the same time, the nodes 102E and 102F are communicating in location 108. Messages transmitted by group members include a locale parameter $\lambda$. The locale parameter $\lambda$ is computed based on the fingerprint of the radio channel being used, so that the locale parameter $\lambda$ used by the nodes 102A-102D is based on the radio channel used in the location 106 and the locale parameter $\lambda$ used by the nodes 102E and 102F is based on the radio channel used in the location 108. The locale parameter $\lambda$ has a short period of usefulness, so that changes in radio channel fingerprints are unlikely to occur over a short enough period to invalidate the parameter. In addition, failure to properly interpret the locale parameter will cause a node to fail to reply to an authentic message; a misinterpretation will not cause an erroneous response to a message replayed by an attacker.

The nodes 102A-102D transmit messages between one another, and the nodes 102E and 102F transmit messages between one another, including the appropriate locale parameter in their messages and examining the radio channel to compute a matching locale parameter for comparison. So long as the messages that are transmitted are between nodes in the same location, the locale parameter in a message will match the locale parameter computed by a receiving node, unless a transmission error occurs or the radio channel finger print changes. In such a case, a retransmission can be performed. Each of the nodes may be able to perform carrier sensing, which in one or more exemplary embodiments of the invention may be IEEE 802.11 carrier sensing. In communications according to the IEEE 802.11 standard, carrier sensing is performed on two levels: physical carrier sensing at the air interface (the physical layer) and virtual carrier sensing at the media access control (MAC) layer. Nodes avoid collisions with non-802.11 radio sources using physical carrier sensing and avoid collisions with other 802.11 device transmissions using virtual carrier sensing. A node designates the channel as busy if either its physical or virtual carrier sensing mechanism indicates that the channel is busy. Carrier sensing is therefore an inherent feature of devices communicating using the 802.11 standard, and embodiments of the present invention adapt this feature to message authentication, to the extent that a message is authenticated as including indicia indicating an expected radio channel fingerprint.

Suppose that the value of the physical carrier sensed by node A as a function of time is designated by $X_A(t)$ and the value of virtual carrier sensed by the same node as a function of time is designated by $Y_A(t)$. XORing $X_A(t)$ and $Y_A(t)$ yields a sequence $Z_A(t)=X_A(t)$ XOR $Y_A(t)$ that is both time- and place-specific. In one or more embodiments of the invention, a node records part of $X_A(t)$ and $Y_A(t)$ using a sliding window mechanism. For example, the node A might store in memory the values of these sequences in the last 100 Beacon Periods (BP).

In one example, the radio fingerprint for node A, $\phi_A$, is the value of $Z_A(t)$ in the interval I of, the most recent 80 Beacon Periods (BP). These values might, for example, span beacon periods from 314159 through 314239. To synchronize with a receiving node, the transmitting node A includes in its message the number of the interval's starting BP.

Upon receiving a message, the receiving node B extracts the fingerprint $\phi_B$ from its memory using the stored $Z_B(t)$ and checks if the locale computed with the fingerprint $\phi_B$ matches that in the message. A match indicates that the received message has originated in the same local network. In another example, the values $\phi_A$ and $\phi_B$ are, as noted above, further processed using a one-way cryptographic function. The message as a whole is, as noted above, encrypted using the shared key K. The various transmitting nodes sense values and make computations as noted above to include locale parameters in their messages and the receiving nodes read the locale parameters and make the computations indicated above to determine of the parameters match actual experienced conditions.

Suppose that an attacker 112 is present in the location 106. It does not have information, such as the shared key K, needed to read messages transmitted between the nodes 102A-102D, but it copies a query from the node 102A and relays it to a cooperating attacker 114. The cooperating attacker 114 transmits the message in the location 108. The query has indicia identifying it as coming from the group 104, and so the nodes 102E and 102F decrypt and read the query. Both of the nodes 102E and 102F note that the query includes the locale parameter $\lambda$, and both nodes read the locale parameter. The locale parameter $\lambda$ was computed based on the fingerprint of the radio channel used in the location 106, and the nodes 102E and 102F compute matching locale parameters based on the fingerprint of the radio channel used in the location 108. The locale parameters will not match, and the nodes 102E and 102F will not respond to the query.

In one or more additional embodiments of the invention, variations of the mechanism by which the locale parameter is created and variations of the mechanism by which the locale parameter is copied may be used. For example, rather than requiring an exact match, a receiving node may determine a difference, or "distance" value between a locale parameter extracted from a received message and a locale parameter computed using a finger print of the sensed radio channel. A "distance" value $\delta$ may be computed, and a node such as the nodes 102A-102F may respond to a query only of the distance value $\delta$ is less than the value of a predefined threshold $\epsilon$.

In one or more further embodiments of the invention, particularly useful in cases in which an attacker is able to successfully impersonate every neighboring node, is to compute the locale parameter $\lambda$ and include a contribution $p_i$ associated with every node i that is an actual member of the group 104. Each node may have an associated random number $p_i$ and each node that is a member of the group may know the contribution $p_i$ of each group member. The numbers $p_i$ for each node may be incorporated into the computation of the locale parameter computed for each message, so that in addition to a parameter computed based on the radio channel signature, the locale parameter will include or be based on an arbitrary number known to be associated with the group. One approach to including such characteristics in the locale parameter is for each node to send $p_i$ extra messages for every 100, for example, sending periods. Such an approach may require additional power consumption, and may not be needed if it can be assured that characteristics of the radio channel used by group members are in fact difficult to duplicate.

Figure 2:
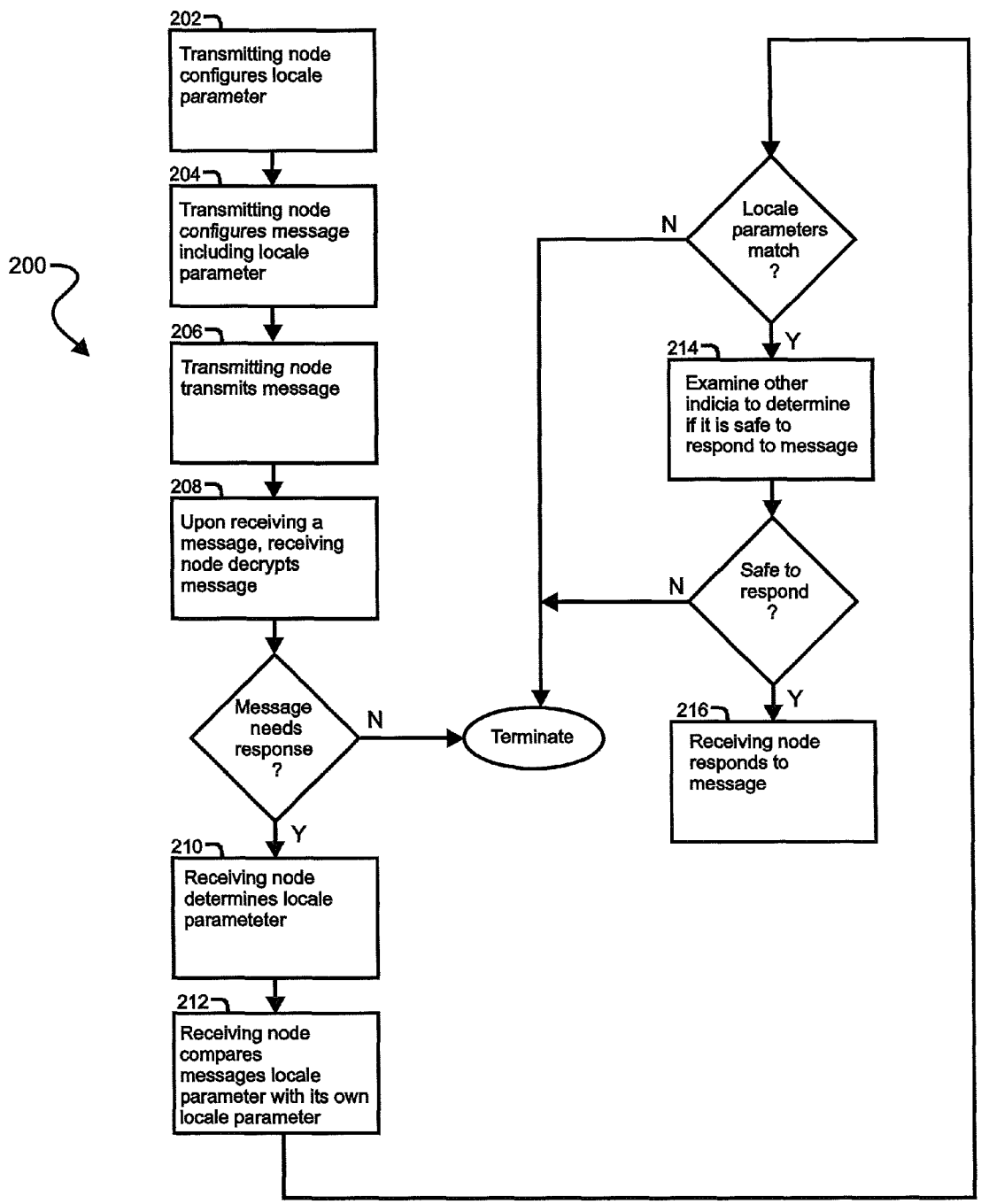
FIG. 2 illustrates a process according to an embodiment of the present invention.

FIG. 2 illustrates a process 200 of message transmission according to an embodiment of the present invention. At step 202, a transmitting node of an ad hoc wireless network and belonging to an ad hoc wireless network group determines a locale parameter to be included in a message for transmission to a receiving node that is also a member of the group. The locale parameter may be based on a radio fingerprint for a radio channel sensed by the transmitting node, and may also incorporate indicia associated with itself and with other nodes. Determining the locale parameter may include processing the parameter, suitably with a cryptographic function such as a cryptographic one-way function. At step 204, the transmitting node configures a message including the locale parameter. Configuring the message may include encrypting and integrity-protecting the message based on a key shared between group members. At step 206, the transmitting node transmits the message. At step 208, upon receiving a message, a receiving node decrypts the message. If the message does not call for a response, the process stops at step 250. If the message calls for a response, the process proceeds to step 210 and the receiving node determines a locale parameter using the same mechanisms as the transmitting node used to determine the locale parameter included in the message, with the receiving node determining its locale parameter based on its sensed radio channel. At step 212, the receiving node compares the message's locale parameter with its own determined locale parameter. If the locale parameters match within a specified threshold, such as an exact match or a difference no more than a threshold, the locale parameters are determined to match and the process proceeds to step 214; otherwise the process terminates at step 250. At step 214, characteristics of the message are examined to determine if other indicia indicate that it can be safely responded to, such as time since transmission and whether the message has already been responded to more than a specified number of times. If the examined indicia indicate that the message can be safely responded to, the process proceeds to step 218 and the receiving node responds to the message; otherwise the process terminates at step 250.

Figure 3:
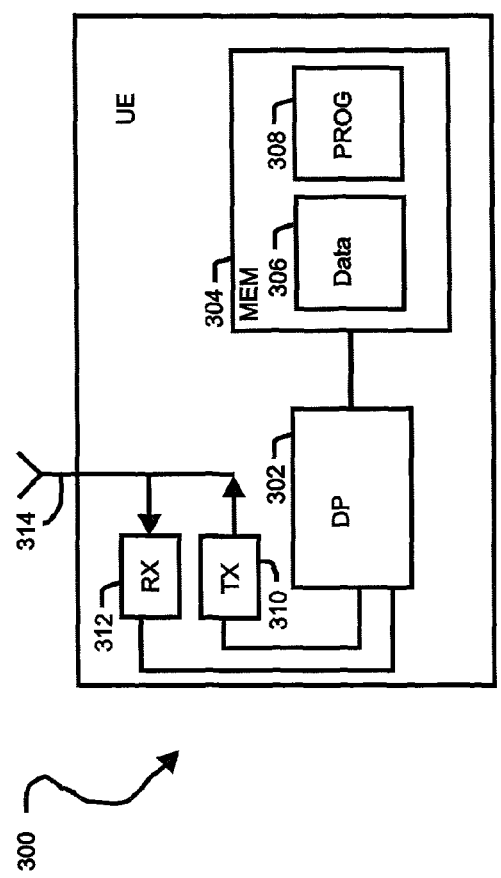
FIG. 3 illustrates elements according to an embodiment of the present invention.

FIG. 3 illustrates an exemplary user device configured to act as a wireless node 300 in an ad hoc network, according to an embodiment of the present invention. The user device comprises a data processor 302 and memory 304, with the memory 304 suitably storing data 306 and software 308. The user device 300 further comprises a transmitter 310, receiver 312, and antenna 316. The software 306 stored in memory 304 includes program instructions (software (SW)) that, when executed by the associated data processor 302, enable the user device to operate in accordance with the exemplary embodiments of this invention. That is, the exemplary embodiments of this invention may be implemented at least in part by computer software executable by the DP 302 of the various electronic components illustrated here, with such components and similar components being deployed in whatever numbers, configurations, and arrangements are desired for the carrying out of the invention. Various embodiments of the invention may be carried out by hardware, or by a combination of software and hardware (and firmware).

The various embodiments of the user device 300 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memory 304 may be of any type suitable to the local technical environment and may be implemented using any suitable data storage technology, such as semiconductor based memory devices, flash memory, magnetic memory devices and systems, optical memory devices and systems, fixed memory and removable memory. The data processor 302 may be of any type suitable to the local technical environment, and may include one or more of general purpose computers, special purpose computers, microprocessors, digital signal processors (DSPs) and processors based on multi-core processor architectures, as non-limiting examples.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. An apparatus comprising:
at least one processor;
memory storing computer program code;
wherein the memory storing the computer program code is configured to, with the at least one processor, cause the apparatus to at least:
upon receipt by a receiving wireless node of a message associated with a group of wireless nodes, compare indicia in the message against indicia determined based on sensed radio channel characteristics for a radio channel used for communication between nodes belonging to a group with which the message is associated, wherein the nodes belonging to the group are communicating in relatively close proximity to one another, and wherein the sensed radio channel characteristics on which determination of the indicia are based comprise characteristics of one or more physical radio carriers used in locale in which members of the group are communicating with one another, and wherein the sensed radio channel characteristics are determined at least in part through IEEE 802.11 radio carrier sensing, wherein IEEE 802.11 radio carrier sensing comprises sensing a value of an IEEE 802.11 physical carrier and sensing a value of an IEEE 802.11 virtual carrier, and wherein determining the indicia based on sensed radio channel characteristics comprises determining a sequence of physical and virtual carrier values that is time and place specific; and
direct response by the receiving wireless node to the message only if the indicia in the message match the indicia determined based on the sensed radio channel characteristics within a specified threshold.

2. The apparatus of claim 1, wherein the indicia in the message comprise a parameter determined based on radio channel characteristics sensed by a transmitting wireless node configuring the message.

3. The apparatus of claim 2, wherein determining the parameter comprises cryptographic processing of the parameter.

4. The apparatus of claim 1, wherein the parameter is determined based on a contribution from at least one wireless node belonging to the group.

5. The apparatus of claim 1, wherein comparing the indicia comprise computing a difference value and determining whether the distance value between the indicia in the message and the determined indicia is less than a specified threshold.

6. The apparatus of claim 1, wherein the message is encrypted and integrity-protected based on a shared key accessible to members of the group.

7. An apparatus comprising:
at least one processor; memory storing computer program code;
wherein the memory storing the computer program code is configured to, with the at least one processor, cause the apparatus to at least:
sense characteristics of a radio channel used for communication between nodes belonging to a group of wireless nodes operating in a local environment, wherein members of the group of wireless nodes are communicated in relatively close proximity to one another, wherein the members of the group of wireless nodes are configured to privately communicate messages between one another using shared information, and wherein the sensed radio channel characteristics comprise characteristics of one or more physical radio carriers used in the locale in which the members of the group are communicating with one another, and wherein the sensed radio channel characteristics are determined at least in part through IEEE 802.11 radio carrier sensing, wherein IEEE 802.11 radio carrier sensing comprises sensing a value of an IEEE 802.11 physical carrier and sensing a value of an IEEE 802.11 virtual carrier;
configure a first parameter value based on the sensed characteristics, wherein determining the first parameter value based on sensed radio channel characteristics comprises determining a sequence of physical and virtual carrier values that is time and place specific; and
configure a message for transmission to at least one member of the group of associated wireless nodes, with the message being configured to include the first parameter;
wherein the first parameter value is configured so that a receiving wireless node receiving the message will respond to the message only if the first parameter value matches a second parameter value determined by the receiving wireless node based on sensing of a radio channel by the receiving wireless node.

8. The apparatus of claim 7, wherein determining at least one of the first and the second parameter values comprises cryptographic processing of the parameter.

9. The apparatus of claim 7, wherein the first parameter value is determined based on a contribution from at least one wireless node belonging to the group.

10. A method comprising: upon receipt by a receiving wireless node of a message associated with a group of wireless nodes, comparing indicia in the message against indicia determined based on sensed radio channel characteristics for a radio channel used for communication between nodes belonging to a group with which the message is associated, wherein the nodes belonging to the group are communicating in relatively close proximity to one another, and wherein the radio channel characteristics on which determination of the indicia are based comprise radio conditions of one or more physical radio carriers used in locale in which members of the group are communicating with one another, and wherein the radio channel characteristics are determined at least in part through IEEE 802.11 radio carrier sensing, wherein IEEE 802.11 radio carrier sensing comprises sensing a value of an IEEE 802.11 physical carrier and sensing a value of an IEEE 802.11 virtual carrier, and wherein determining the indicia based on sensed radio channel characteristics comprises determining a sequence of physical and virtual carrier values that is time and place specific; and directing response by the receiving wireless node to the message only if the indicia in the message match the indicia determined based on the sensed radio channel characteristics within a specified threshold.

11. The method of claim 10, wherein the indicia in the message comprise a parameter determined based on radio channel characteristics sensed by a transmitting wireless node configuring the message.

12. The method of claim 11, wherein determining the parameter comprises cryptographic processing of the parameter.

13. The method of claim 10, wherein a second parameter value is determined based on a contribution from at least one wireless node belonging to the group.

14. The method of claim 10, wherein comparing the indicia comprise computing a difference value and determining whether the distance value between the indicia in the message and the determined indicia is less than a specified threshold.

15. The method of claim 10, wherein the message is encrypted and integrity-protected based on a shared key accessible to members of the group.

16. A method comprising: sensing characteristics of a radio channel used for communication between nodes belonging to a group of wireless nodes operating in a local environment, wherein members of the group of wireless nodes are communicating in relatively close proximity to one another, wherein the members of the group of wireless nodes are configured to privately communicate messages between one another using shared information, and wherein the sensed radio channel characteristics comprise characteristics of one or more physical radio carriers used in the locale in which the members of the group are communicating with one another, and wherein the radio channel characteristics are determined at least in part through IEEE 802.11 radio carrier sensing wherein IEEE 802.11 radio carrier sensing comprises sensing a value of an IEEE 802.11 physical carrier and sensing a value of an IEEE 802.11 virtual carrier;

configuring a first parameter value based on the sensed characteristics, wherein determining the first parameter value based on sensed radio channel characteristics comprises determining a sequence of physical and virtual carrier values that is time and place specific; and configuring a message for transmission to at least one member of the group of associated wireless nodes, with the message being configured to include the first parameter;

wherein the first parameter value is configured so that a receiving wireless node receiving the message will respond to the message only if the first parameter value matches a second parameter value determined by the receiving wireless node based on sensing of a radio channel by the receiving wireless node.

17. The method of claim 16, wherein determining at least one of the first and second parameter values comprises cryptographic processing of the parameter.

18. The method of claim 16, wherein the second parameter value is determined based on a contribution from at least one wireless node belonging to the group.

19. A non-transitory computer readable medium storing a program of instructions, execution of which by a processor configures an apparatus to at least:

upon receipt by a receiving wireless node of a message associated with a group of wireless nodes, compare indicia in the message against indicia determined based on sensed radio channel characteristics for a radio channel used for communication between nodes belonging to a group with which the message is associated, wherein the nodes belonging to the group are communicating in relatively close proximity to one another, and wherein the radio channel characteristics on which determination of the indicia are based comprise characteristics of one or more physical radio carriers used in locale in which members of the group are communicating with one another, and wherein the radio channel characteristics are determined at least in part through IEEE 802.11 radio carrier sensing, wherein IEEE 802.11 radio carrier sensing comprises sensing a value of an IEEE 802.11 physical carrier and sensing a value of an IEEE 802.11 virtual carrier, and wherein determining the indicia based on sensed radio channel characteristics comprises determining a sequence of physical and virtual carrier values that is time and place specific; and direct response by the receiving wireless node to the message only if the indicia in the message match the indicia determined based on the sensed radio channel characteristics within a specified threshold.

20. The computer readable medium of claim 19, wherein the indicia in the message comprise a parameter determined based on radio channel characteristics sensed by a transmitting wireless node configuring the message.

21. The computer readable medium of claim 20, wherein determining the parameter comprises cryptographic processing of the parameter.

22. The computer readable medium of claim 19, wherein the parameter is determined based on a contribution from at least one wireless node belonging to the group.

23. The computer readable medium of claim 19, wherein comparing the indicia comprise computing a difference value and determining whether the distance value between the indicia in the message and the determined indicia is less than a specified threshold.

24. The computer readable medium of claim 19, wherein the message is encrypted and integrity-protected based on a shared key accessible to members of the group.

25. A non-transitory computer readable medium storing a program of instructions, execution of which by a processor configures an apparatus to at least:

sense characteristics of a radio channel used for communication between nodes belonging to a group of wireless nodes operating in a local environment, wherein the members of the group of wireless nodes are communicating in relatively close proximity to one another, wherein the members of the group of wireless nodes are configured to privately communicate messages between one another using shared information, and wherein the radio channel characteristics on which determination of the indicia are based comprise characteristics of one or more physical radio carriers used in the locale in which the members of the group are communicating with one another, and wherein the radio channel characteristics are determined at least in part through IEEE 802.11 radio carrier sensing wherein IEEE 802.11 radio carrier sensing comprises sensing a value of an IEEE 802.11 physical carrier and sensing a value of an IEEE 802.11 virtual carrier;

configure a first parameter value based on the sensed characteristics, wherein determining the first parameter value based on sensed radio channel characteristics comprises determining a sequence of physical and virtual carrier values that is time and place specific; and configure a message for transmission to at least one member of the group of associated wireless nodes, with the message being configured to include the first parameter;

wherein the first parameter value is configured so that a receiving wireless node receiving the message will respond to the message only if the first parameter value matches a second parameter value determined by the receiving wireless node based on sensing of a radio channel by the receiving wireless node.

26. The computer readable medium of claim 25, wherein determining at least one of the first and the second parameter values comprises cryptographic processing of the parameter.

27. The computer readable medium of claim 25, wherein the second parameter value is determined based on a contribution from at least one wireless node belonging to the group.

* * * * *